May 31, 1932.   G. F. ROYER   1,860,480
SCREENING APPARATUS
Filed March 19, 1930   4 Sheets-Sheet 1
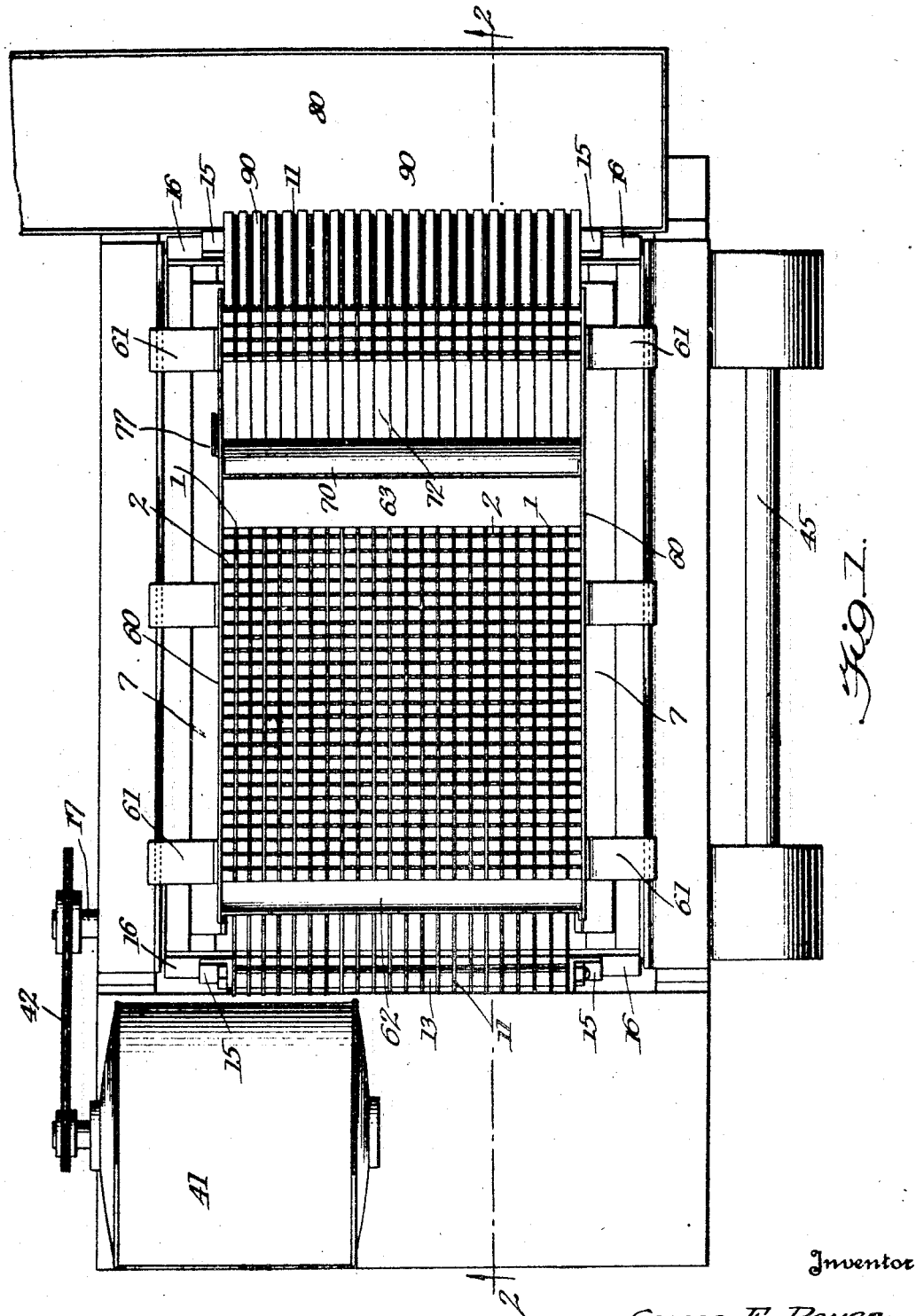

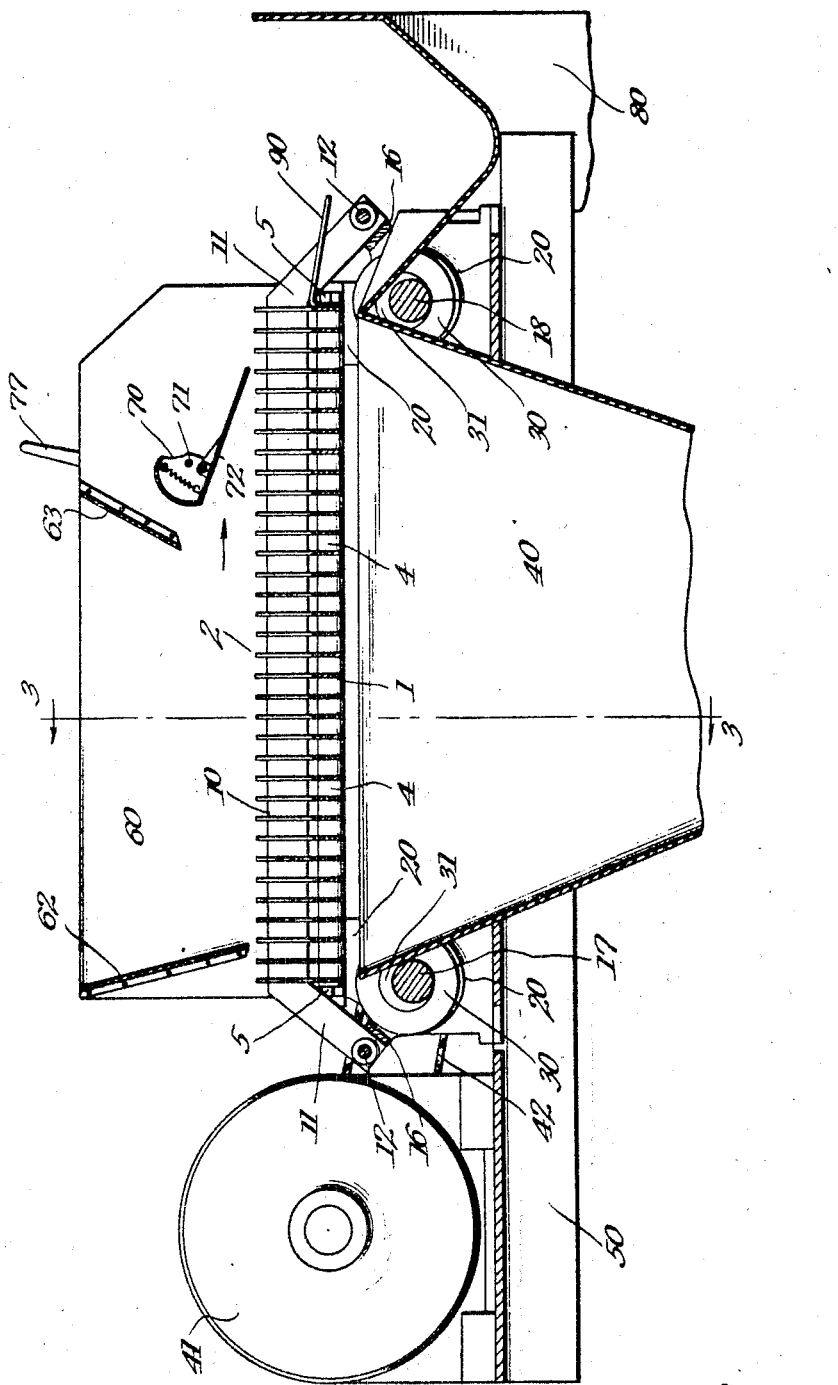

May 31, 1932.  G. F. ROYER  1,860,480
SCREENING APPARATUS
Filed March 19, 1930  4 Sheets-Sheet 3
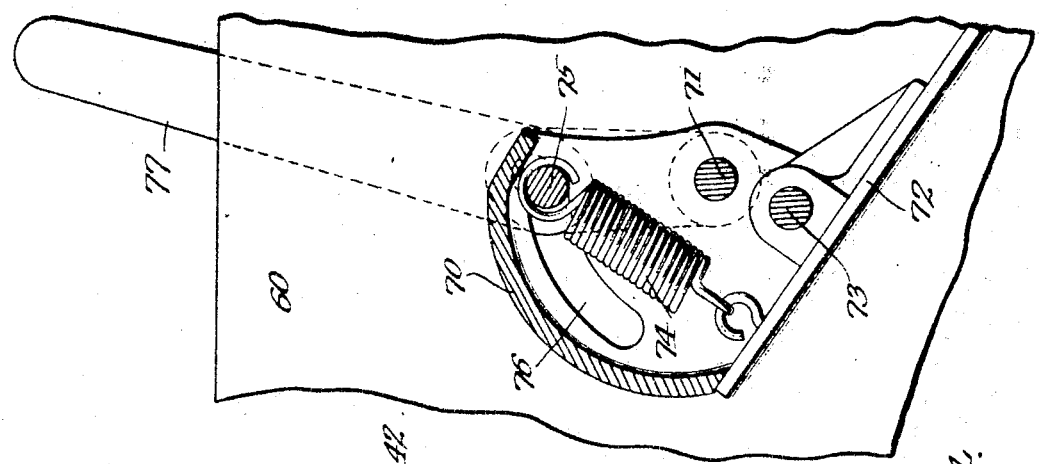
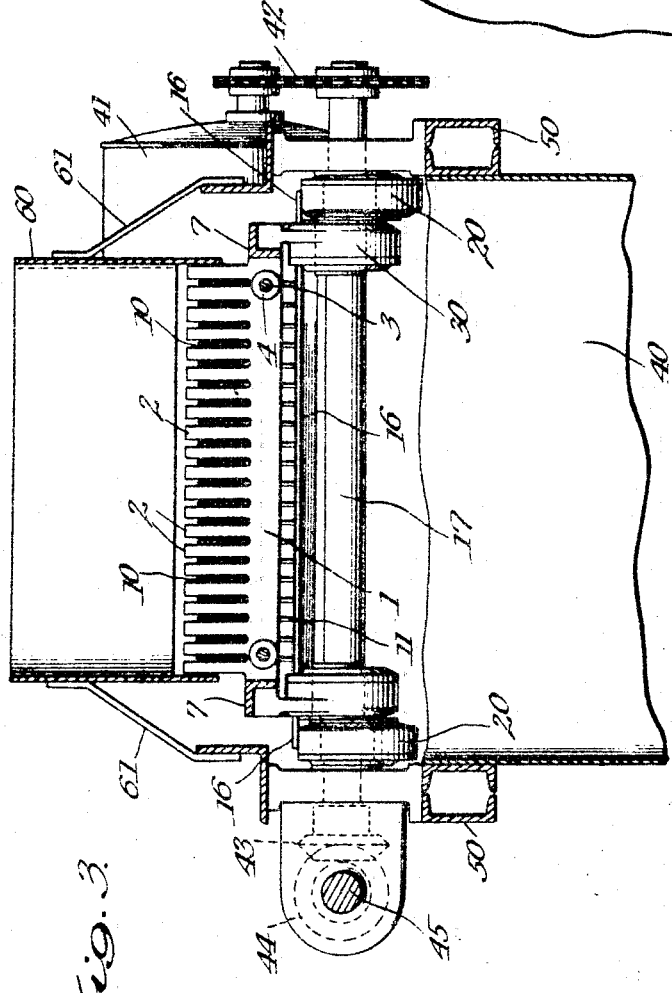
Inventor
George F. Royer.
By Cushman Bryant & Darby
Attorneys May 31, 1932.  G. F. ROYER  1,860,480
SCREENING APPARATUS
Filed March 19, 1930 4 Sheets-Sheet 4
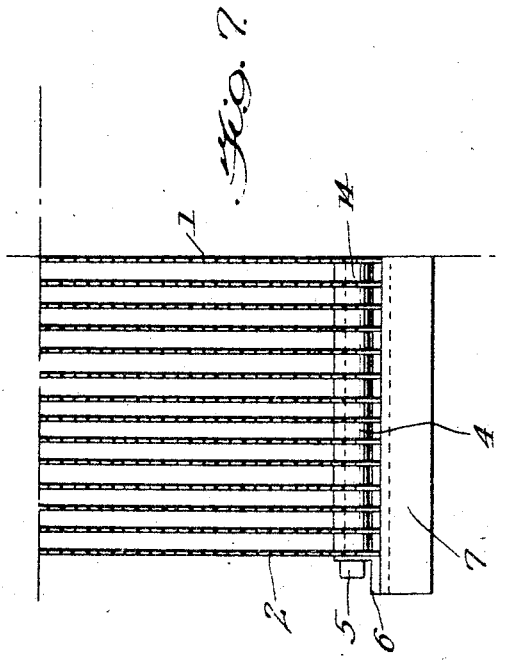
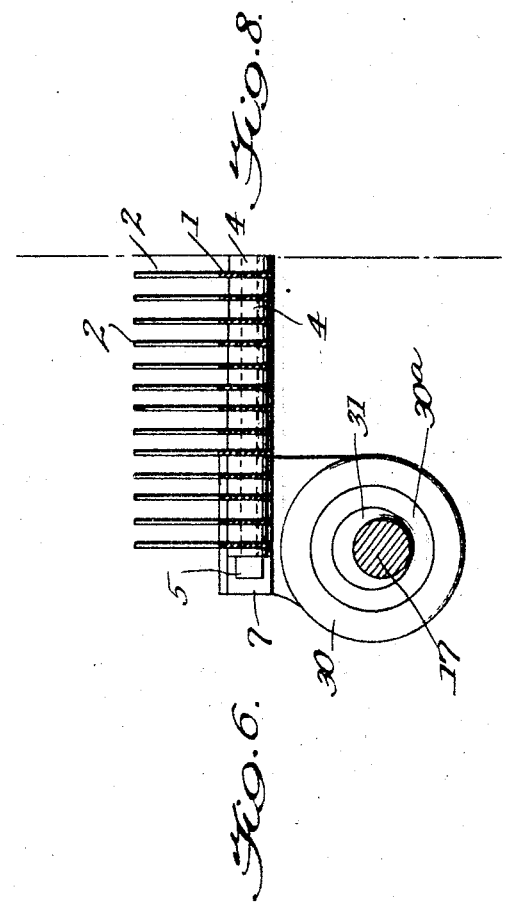
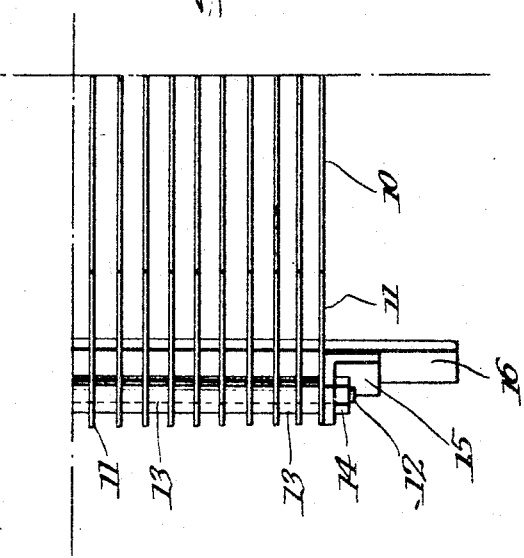
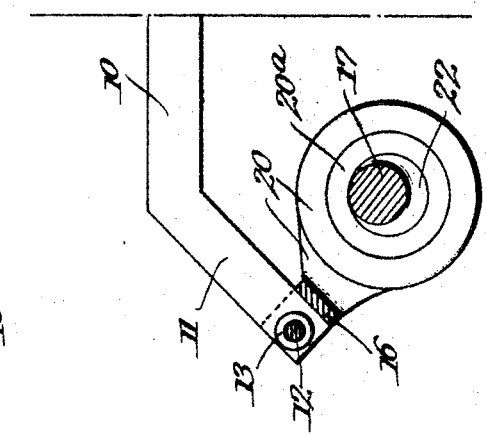
Inventor
George F. Royer
By Cushman Byandt Derby
Attorneys Patented May 31, 1932

1,860,480

UNITED STATES PATENT OFFICE

GEORGE F. ROYER, OF WILKES-BARRE, PENNSYLVANIA, ASSIGNOR TO ROYER FOUNDRY & MACHINE COMPANY, OF WILKES-BARRE, PENNSYLVANIA, A CORPORATION OF PENNSYLVANIA

SCREENING APPARATUS

Application filed March 19, 1930. Serial No. 437,223.

The present invention relates to improvements in screening apparatus, and in particular to an apparatus designed for use in separating undesirable particles and pieces from a mixture of granular material, such as employed in foundries for making molds.

While features of the invention may be satisfactorily employed in screening apparatus for other purposes, the invention has been found very effective for separating scrap metal, such as fins of castings, gaggers and nails, and stones or undesirable large particles, from a mass of foundry sand, which commonly comprises a mixture of fresh sand and sand that is provided by breaking up previously formed or used molds.

The invention will be described in connection with the accompanying drawings, in which:

Figure 1 is a plan of a screening apparatus constructed in accordance with the present invention.

Figure 2 is a vertical sectional view substantially on the line 2—2 of Figure 1.

Figure 3 is a sectional view substantially on the line 3—3 of Figure 2.

Figure 4 is a detail, on an enlarged scale.

Figure 5 is a plan, on an enlarged scale, of a portion of one of the main screen elements.

Figure 6 is an elevation of parts shown in Figure 5.

Figure 7 is a plan, on an enlarged scale, of a portion of the other main screen element.

Figure 8 is an elevation of parts shown in Figure 7.

Essentially, the improved screening apparatus comprises a screen formed of two elements, each including a series of parallel members connected to move as a unit, the members of one section or unit extending transversely of the parallel members of the other sectional unit, and means for vibrating or moving both ends of both said units in similar substantially circular paths, such movement of said sections being in opposite directions.

Referring to the drawings, in the several views of which like parts are designated by the same reference characters, it will be seen that one element of the screen comprises a series of parallel comb-like members 1, having upwardly directed fingers 2. The members 1 are connected by tie-rods or through-bolts 3, on which are arranged suitable spacing members 4, that maintain the desired spacing between the comb-members 1. Suitable nuts 5 at the ends of the rods 3 secure the parts together, and to angle plates 6, which are, in turn, suitably connected to angle frame members 7, so that the entire series of members 1 will constitute a unitary structure.

Cooperating with the screen element or unit including the comb-like members 1 is a second element or unit formed of a series of parallel members 10, which extend through the spaces separating the fingers 2 of the members 1, and beyond both ends of said series of screen members 1.

As shown, the screen members 10 are provided at both ends with downwardly deflected portions 11, which are connected by tie-rods 12, on which are mounted spacing blocks or parts 13, that maintain the members 10 in the required spaced relation.

Nuts 14 on the tie-rods 12 connect the series of members 10 into a unitary structure and to angle brackets 15. The brackets 15 at each end of the apparatus are connected to a cross rail 16.

The two screen elements are supported from parallel shafts 17, 18. As shown, straps 20, having bushings 20a surrounding eccentrics 22, mounted, respectively, on said shafts 17, 18, are connected to the cross frame members 16. Preferably, as shown, there are two eccentrics 22 on the shaft 17, and a similar pair on the shaft 18, all of said eccentrics being duplicates and arranged in parallel relation, so that as the shafts are rotated, the screen element, including the members 10, will receive a vibratory movement, both ends of said members 10 traveling in curvilinear, substantially circular, paths.

The other screen element, including the comb shaped members 1, is similarly supported from the shafts 17, 18, by eccentric-embracing straps 30, which are attached to the angle bar frame members 7, and have bushings 30a surrounding eccentrics 31 on the shafts. The eccentrics 31 within the straps 30, are out of parallelism with the eccentrics 22, being preferably arranged so that they are diametrically opposite the eccentrics supporting the other screen element. Therefore, as the shafts rotate, the screen element or frame unit including the comb-like members will move similarly to the other unit through parallel curvilinear paths, but the members of the two units will travel in opposite directions.

By this arrangement, it will be seen that in effect the fingers of the combs 1 will be caused to move upward between and relative to the members 10, as well as relatively lengthwise of the last said members, to exert a combing action on a mass of material deposited on the screen body. The result of such relative movement between the two screen elements is to separate the desired relatively small granules or particles from the mass of material, and allow the same to fall through the spaces formed by the parallel members of the two screen elements into a guide or receptacle 40.

The shafts 17, 18, are shown as being driven by a motor 41 mounted on a suitable frame 50, on which are also mounted suitable bearings for said shafts. As shown, a sprocket chain 42 transmits power from the motor shaft to a sprocket on the shaft 17. At its opposite end, said shaft is provided with a bevel pinion 43, which meshes with a corresponding pinion 44 on a countershaft 45, that is similarly geared to the shaft 18, so that the two shafts rotate together.

As shown, the frame 50 is formed of suitable channel bars, and on uprights rising from said bars is mounted a suitable hopper. As shown, the side walls 60 of the hopper are supported by inclined braces 61, and the end walls 62, 63, are suitably secured between said sides.

The parts are so arranged that the mass of material treated will be caused to move as a body in the direction of the arrow in Figure 2, and beneath the adjacent end hopper wall 63, which is elevated some distance above the upper face of the screening body.

Between the side walls 60 of the hopper, rearward of the end wall 63, is arranged a means for retarding particles too large to pass through the openings provided by the screen members.

As shown, such means comprises a housing 70 supported by a shaft 71 mounted in suitable bearings in the side hopper walls 60. Within the housing are pivotally supported a series of fingers 72 which extend in a downwardly inclined direction to close proximity to the screen body between the adjacent hopper wall 63 and the discharge edge or end of the screen from which particles too large to pass through the interstices of the screen are discharged into a receptacle or chute 80 that extends laterally beyond the side of the apparatus.

Each of the fingers 72 is mounted to turn about an axis 73, and by means of a spring 74 is normally held in the position shown in Figures 2 and 4. The upper ends of the springs 74 are connected to a rod 75 supported by the side walls of the hopper and passing through a slot 76 in the housing 70. By means of a handle or lever 77 connected to one end of the shaft 71, the housing 70 and all of the fingers 72 carried thereby may be rocked in opposition to the tension of the springs 74, so that the free ends of the fingers will be lifted upward away from the screen body in case any foreign object or large particle should become wedged between the screen and such fingers. Particles too large to pass through the interstices formed by the screen members 1 and 10, may effect upward movement of the individual fingers 72 against the action of the several springs 74, and the passage of such relatively large particles into the discharge chute 80, or, as before stated, if it is found necessary, the entire series of retarding fingers and their supporting housing may be rocked by manipulation of the handle 77.

Particles which pass beneath the fingers 72 will be guided into the discharge chute 80 by finger-like members 90 that are secured to the adjacent comb-like plate 1, and project between the downwardly deflected sections 11 at the discharge end of the screen members 10.

It is believed that the operation and advantages of the invention will be readily understood from the foregoing description and the drawings.

It will be noted that by constructing the screen elements in the form described and imparting vibratory movement of the character referred to to them, a very effective screening action is provided.

The supporting frame 50 may be of any suitable character. For example, it may be a relatively stationary frame-work, or, if desired, it may be mounted upon a motor truck, with the parts so arranged that the receptacle 40 will be above a sand treating mechanism, such as that disclosed in my earlier Patent No. 1,559,915. In such an embodiment of the invention the truck would also be provided with an automatic means for lifting sand to be treated from a foundry floor, for example, and delivering the same onto the separating screen hereinbefore described.

As before pointed out, rotation of the eccentrics by which the screen elements are supported acts to impart impulses to the scrap or particles which cannot pass through the screen only in one direction, namely, toward and beneath the wall 63 of the hopper and the fingers 72, which act to retard such movement of the separated particles toward the discharge chute 80, are positioned outside of the hopper, and not in the path of the material to be treated, that is, deposited on the screen through such hopper.

The receptacle 40 for the screened particles may be, as before referred to, in the form of a chute which will deliver its contents onto a separator, such as shown in my former patent, or may be provided with a bottom having, if desired, an opening which can be closed by a suitable slide or other means.

I claim:

1. In a screening apparatus, a screen having a screening body comprising two units each including a plurality of parallel members connected together, the members of one unit extending transversely of those of the other, and means for actuating both said units to simultaneously move the members thereof in opposite directions through parallel substantially circular paths.

2. In a screening apparatus, a screen having a screening body composed of two sets of parallel members, the members of one set extending transversely of those of the other set, and means for imparting a substantially circular movement to both ends of said members, the members in one set moving in a direction opposite that in which the members of the other set move.

3. In a screening apparatus, a screen comprising two sets of parallel members, the members of one set extending transversely of those of the other and the members of each set being connected at both ends, rotary means supporting and imparting a substantially circular movement to both ends of the members of one of said sets, and means for imparting similar circular movements to the members of the other set in the opposite direction.

4. In a screening apparatus, a screen comprising two sets of parallel members, the members of one set extending transversely of those of the other and the members of each set being connected at both ends, a rotary means supporting and imparting a substantially circular movement to both ends of the members of one of said members, and means arranged coaxial with those aforesaid for imparting similar movement to both ends of the members of the other set.

5. In a screening apparatus, the combination of two screen elements, each comprising a plurality of parallel members, the members of one element extending transversely of those of the other element, eccentrics supporting both said elements at each end, the eccentrics supporting one element being in diametrically opposite relation to the eccentrics supporting the other element, and means for rotating the eccentrics.

6. In a screening apparatus, the combination of two screen elements, each comprising a plurality of parallel members, the members of one element extending transversely of those of the other element, eccentrics supporting both said elements at each end, the eccentrics supporting one element being in nonparallel relation to the eccentrics supporting the other element, whereby the two elements will not be simultaneously moved in the same direction, and means for rotating all of the eccentrics.

7. In a screening apparatus, the combination of two screen elements, each comprising a plurality of parallel members, the members of one element extending transversely of those of the other element, two shafts positioned adjacent the ends of said elements, eccentrics on both said shafts supporting both said elements, the eccentrics supporting one element being in nonparallel relation to those supporting the other, and means for rotating the shafts.

8. In a screening apparatus, the combination of two shafts arranged in substantially horizontal parallelism, duplicate eccentrics mounted on each shaft, a screen element supported at both ends by said eccentrics and including a plurality of parallel members extending in a direction substantially at right angles to the length of the shafts, a second screen element including a plurality of parallel members extending substantially parallel to the length of the shafts, eccentrics on both shafts supporting said second screen element, the eccentrics on each shaft supporting each screen element being in nonparallel relation to the supporting eccentrics for the other screen element, and means for rotating the shafts.

9. In a screening apparatus, the combination of two shafts arranged in substantially horizontal parallelism, duplicate eccentrics mounted in each shaft, a screen element supported at both ends by said eccentrics and including a plurality of parallel members extending in a direction substantially at right angles to the length of the shafts, a second screen element including a plurality of parallel members extending substantially parallel to the length of the shafts, the members of the last said element extending through notches formed in edges of the parallel members of the first said screen element, eccentrics on both shafts supporting both screen elements, the eccentrics on each shaft supporting each of said screen elements being in nonparallel relation to the supporting eccentrics thereon for the other screen element, and means for rotating the shafts.

10. In a screening apparatus, the combination of a screen element comprising a series of parallel comb-like members provided with upwardly directed fingers, a second screen element comprising a series of parallel members extending through the spaces between the fingers of the first said members, and means for actuating both said elements to move the members thereof in opposite directions through parallel curvilinear paths.

11. In a screening apparatus, the combination of a screen element comprising a series of parallel comb-like members provided with upwardly directed fingers, and means connecting said members so that all of them may move as a unit, a second screen element comprising a series of parallel members extending through the spaces between the fingers of said comb members and means connecting the members of said second element so that they will move as a unit, eccentric supports for both ends of both said elements, and means for rotating the eccentrics to move the members of both screen elements in parallel curvilinear paths, the eccentrics being so related that the members of said elements move respectively in opposite directions.

12. In a screening apparatus, the combination of a screen element comprising a series of parallel comb-like members provided with upwardly directed fingers, a second screen element comprising a series of parallel members extending through the spaces between the fingers of the members of the first said element, two shafts extending transversely of the members of said second element near the ends thereof, eccentrics on both said shafts, means supporting both screen elements from said eccentrics, and means for rotating the shafts.

13. In a screening apparatus, the combination of a screen element comprising a series of parallel comb-like members provided with upwardly directed fingers, a second screen element comprising a series of parallel members extending through the spaces between the fingers of the first said members, two shafts extending transversely of the members of said second element near the ends thereof, eccentrics on both said shafts, means supporting both screen elements from said eccentrics, and means for rotating the shafts, the eccentric support for one screen element being in nonparallel relation to that for the other, for the purpose described.

14. In a screening apparatus, the combination of a screen element comprising a series of parallel comb-like members provided with upwardly directed fingers, and tie-rods connecting all of said members, a second screen element comprising a series of parallel members extending through the spaces between the fingers of the first said members, two parallel coaxial eccentrics supporting each end of the first said element, similar eccentrics supporting each end of the second said element, and means for rotating all of the eccentrics.

15. In a screening apparatus, the combination of a screen element comprising a series of parallel comb-like members provided with upwardly directed fingers and means connecting said members to move as a unit, a second screen element comprising a series of parallel members extending through the spaces between the fingers of the first said members and having vertically deflected end portions beyond the members of the first said screen element, means connecting the deflected end portions of said members so that they will move together, parallel eccentrics supporting each of the deflected ends of the members of the second screen element, similar eccentrics supporting the first said element and arranged in nonparallel relation to those aforesaid, and means for rotating all of the eccentrics.

16. In a screening apparatus, the combination of a screen element comprising a series of parallel comb-like members provided with upwardly directed fingers and means connecting said members to move as a unit, a second screen element comprising a series of parallel members extending through the spaces between the fingers of the first said members and having downwardly deflected end portions beyond the members of the first said screen element, two pairs of parallel eccentrics supporting the deflected end portions of the members of the second screen element, two pairs of eccentrics supporting the first said screen element and arranged in non-parallel relation to the supporting eccentrics of the second screen element, and means for rotating all of said eccentrics.

17. In a screening apparatus, the combination of a screen comprising two units, one including a series of comb-like members having upwardly directed fingers and the other a series of parallel members extending through the spaces between the fingers of the first said unit, means for actuating both units to simultaneously move the members thereof in opposite directions through parallel curvilinear paths, and a receptacle positioned to receive pieces of material deposited on the screen and too large to pass through the spaces formed by said fingers and members.

18. In a screening apparatus, the combination of a screen comprising two units, one including a series of comb-like members having upwardly directed fingers and the other a series of parallel members extending through the spaces between the fingers of the first said unit, means for actuating both units to simultaneously move the members thereof in opposite directions through parallel curvilinear paths, a receptacle for scrap separated from material deposited on the screen positioned at the discharge end of the screen, and extension pieces attached to the adjacent end comb member of the first said unit and projecting between the members of the second said unit over said receptacle.

19. In a screening apparatus, the combination of a screen body, means for vibrating said body, whereby particles too large to pass through the interstices in said body are moved toward one edge of the body, a hopper above the screen body, a plurality of fingers mounted to rock about a horizontal axis between the adjacent end wall of the hopper and said discharge edge of the screen and extending in a downward inclined direction toward the screen, springs for yieldingly holding each of said fingers in position to retard movement of particles by the screen to said discharge edge, and a lever connected with all of said fingers and adapted to rock them into inoperative position about said axis.

20. In a screening apparatus, the combination of a screen body, means for vibrating said body, whereby particles too large to pass through the interstices in said body are moved toward one edge of the body, a hopper above the screen having its end wall adjacent said discharge edge of the screen spaced above the screen to a greater extent than the opposite wall, and a series of fingers mounted to turn about a horizontal axis between said discharge edge of the screen and the adjacent hopper wall and extending in a downwardly inclined direction substantially to the surface of the screen, for the purpose described.

21. In a screening apparatus, the combination of a screen body, means for vibrating said body, whereby particles too large to pass through the interstices in said body are moved toward one edge of the body, a hopper above the screen having its end wall adjacent said discharge edge of the screen spaced above the screen to a greater extent than the opposite wall, a housing pivotally mounted to rock about a horizontal axis between the discharge edge of the screen and the adjacent wall of the hopper, a series of material retarding fingers independently pivoted in said housing and extending in a downwardly inclined direction toward the discharge edge of the screen, and means for rocking said housing to carry all of said fingers to inoperative position.

In testimony whereof I have hereunto set my hand.

GEORGE F. ROYER.